United States Patent [19]

Herndon

[11] 3,740,469

[45] June 19, 1973

[54] REFLECTIVE PANORAMIC T.V. PROJECTION SYSTEM

[75] Inventor: John W. Herndon, Orlando, Fla.

[73] Assignee: The United States of America as represented by the Secretary of the Navy, Washington, D.C.

[22] Filed: Apr. 19, 1972

[21] Appl. No.: 245,415

[52] U.S. Cl. .............. 178/6.8, 178/7.5 D, 178/7.2, 178/DIG. 35, 178/7.6

[51] Int. Cl. ............................................ H04n 7/00

[58] Field of Search ................. 178/6.8, 7.5 D, 7.2, 178/DIG. 35, 7.6, 7.88

[56] References Cited

UNITED STATES PATENTS

| | | | |
|---|---|---|---|
| 3,432,219 | 3/1969 | Shenker et al. | 178/7.88 |
| 3,458,252 | 7/1969 | Ludwig | 178/7.88 |
| 3,505,465 | 4/1970 | Rees | 178/7.88 |

*Primary Examiner*—Richard Murray
*Attorney*—Richard S. Sciascia, John W. Pease and Harvey A. David et al.

[57] ABSTRACT

A 360° panoramic television display system employs a plurality of television projection tubes operating in a single-line-scan mode and located in fixed positions around the vertical axis of the display system. The projected single-line-scans from the tubes are mediated by a reflective assembly contoured and faceted such that, when rotated, the single-line-scans, oriented vertically, are caused to move on the display screen in the horizontal direction at the television field rate, thus generating a television raster through 360°.

7 Claims, 15 Drawing Figures

REFLECTIVE PANORAMIC T.V. PROJECTION SYSTEM

BACKGROUND OF THE INVENTION

This invention relates to panoramic projection systems and more particularly to an improved 360° television display system. In the field of training devices panoramic projection systems find wide application. One problem with wide angle television systems used for panoramic displays is picture brightness. This problem is significantly alleviated by the use of a plurality of projection sets to form a composite 360° picture. These systems are generally hampered by some misregister of the borders of the individual portions of the composite display. Rotating single-line-scan projection systems do not suffer the problem of borders and further enhance picture brightness. The system described in U. S. Pat. No. 3,542,948 is an example of that technique. The latter system, however, requires rather massive dynamic assemblies, slip rings and drive motors. It is desirable to accomplish the objectives of the single-line-scan rotating projection system while avoiding rotation of the television projectors and the problems which result therefrom.

SUMMARY OF THE INVENTION

With the foregoing in mind, it is a principal object of this invention to provide a means of television projection for a 360 degree display utilizing a plurality of television projection tubes operating in a single-line-scan mode and in fixed positions around the vertical axis of the system.

Another object of this invention is to mediate the single-line-scan beams from the projection tubes with a rotating reflective assembly.

It is a further objective to configure the said reflective assembly with a plurality of facets equal to the number of television projection tubes used.

Still another object is to provide a vertical profile for each facet of said reflective assembly such that equal length optical paths result from projection tube source to display screen over the length of the single-line-scan.

Yet another object is to provide a horizontal profile for each facet of said reflective assembly such that equal length optical paths result from projection tube source to display screen and such that when rotated through an angle equal to the facet angle the displayed single-line-scan is rotated through the same angle on the screen.

Another object is to rotate the reflective assembly such that each facet mediates the projected single-line-scan beam to the screen and through the desired angle as each projection tube beam is encountered, then to the next, and to the next until completing 360° of rotation wherein the process becomes repetitive for each cycle of rotation.

A further object is to rotate the reflective assembly at such an angular velocity as to cause the vertically displayed single-line-scans to move horizontally at the television field rate, thus generating a television raster.

Yet a further object is to select the line scan frequency such that each facet of the reflective assembly first mediates a beam to lay down a first field and then to the next sector of the screen for an interlace field; thus, a 2:1 interlaced raster (or other ratios, as desired) is generated continuously around the 360° screen.

Another object is to use said reflective means in conjunction with television cameras in essentially the same mode of operation, as a means of television information pick-up for the projection system.

The invention may be further said to reside in certain arrangements of electrical, electronic and mechanical parts whereby the foregoing objects and advantages are achieved, as well as others which will become apparent from the following description of a presently preferred embodiment when read in conjunction with the accompanying sheets of drawings.

Figure 1:
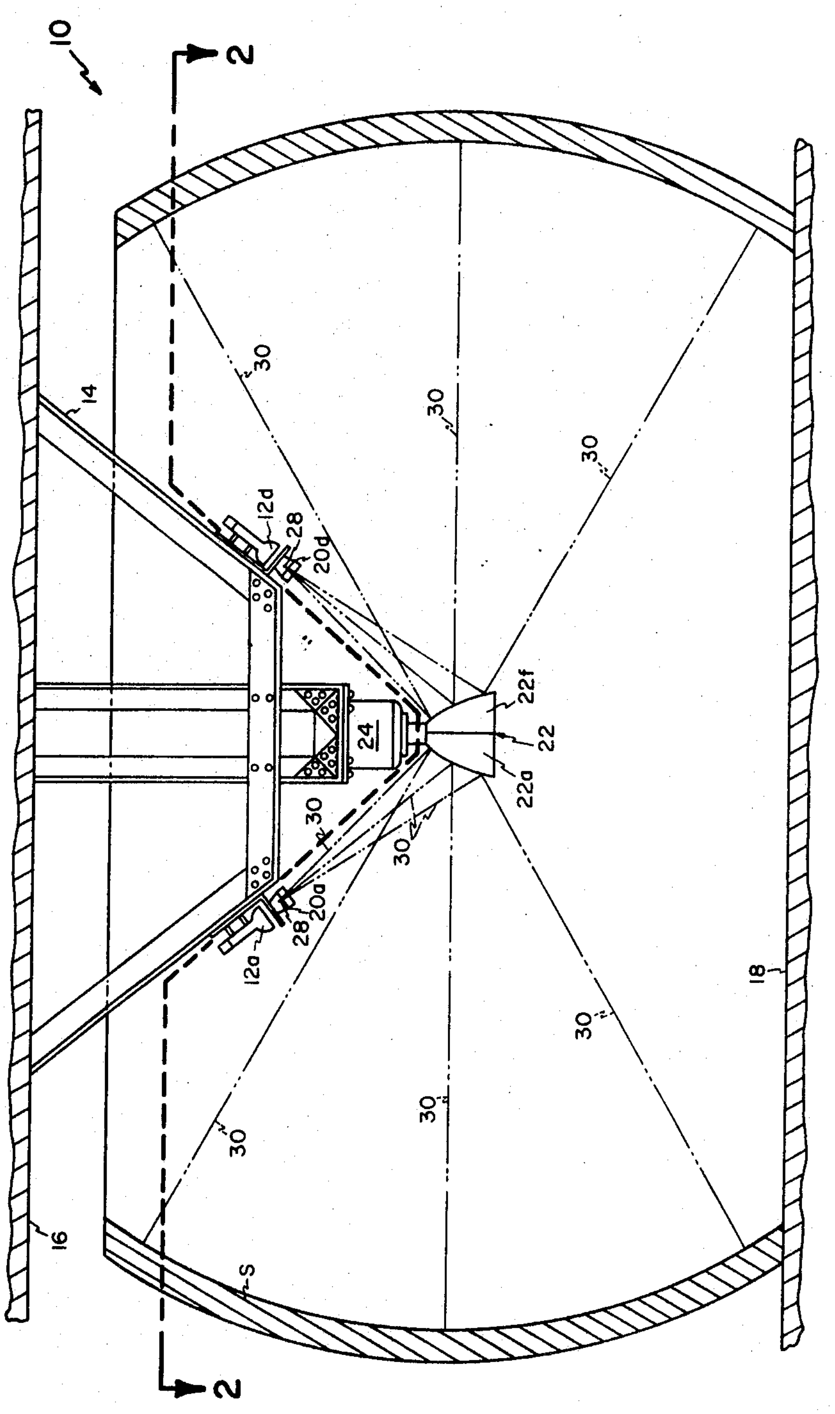
FIG. 1 is a vertical sectional view of a single-line-scan, fixed projector, rotating reflector panoramic display system embodying the invention.
Figure 8:
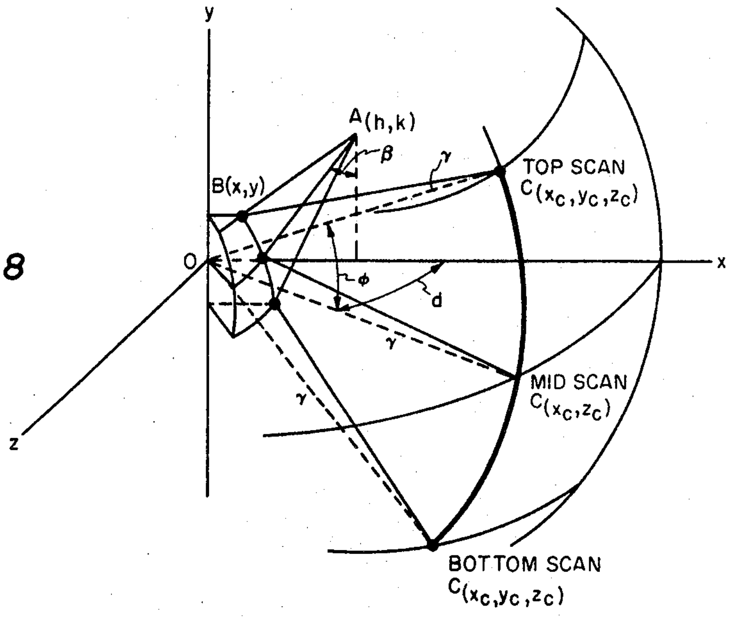
Figure 9:
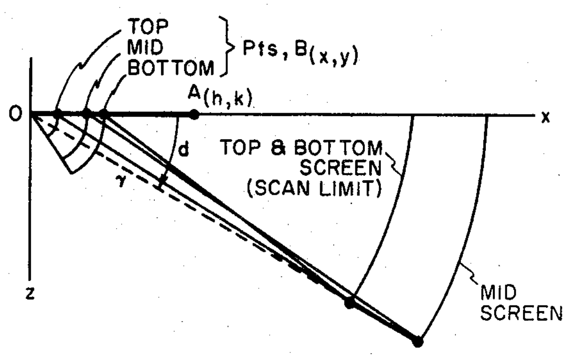
Figure 10:
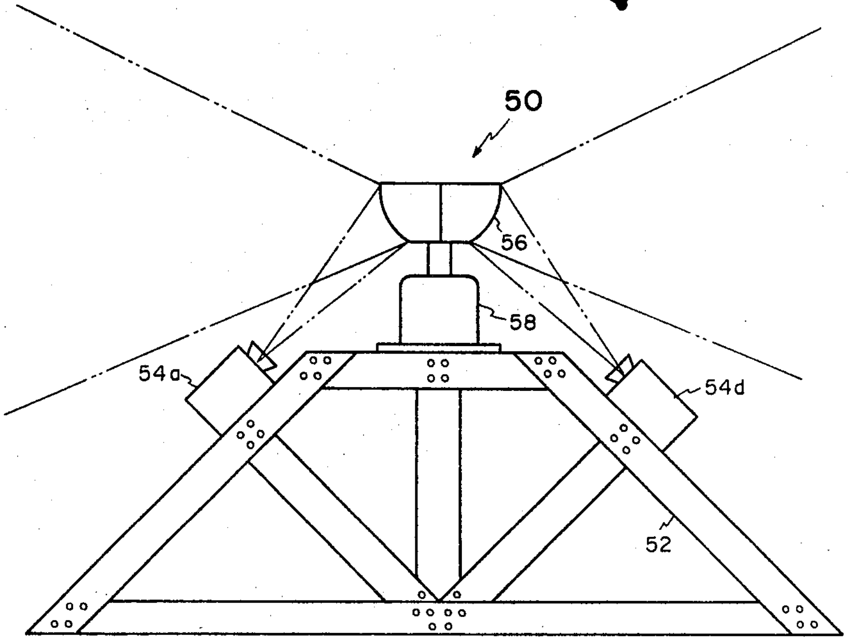

FIGS. *3a* – *3f* are diagrammatic illustrations showing the rotating reflective element in different operative positions;

FIGS. 4 – 9 are diagrammatic illustrations showing the various angles and distances from which equations of coordinates of points on the facets of a rotating reflection element of the system of FIG. 1 are derived; and FIG. 10 is a view illustrating a television camera system for generating signals for use by the projection system of FIG. 1.

DESCRIPTION OF THE PREFERRED EMBODIMENT

Figure 2:
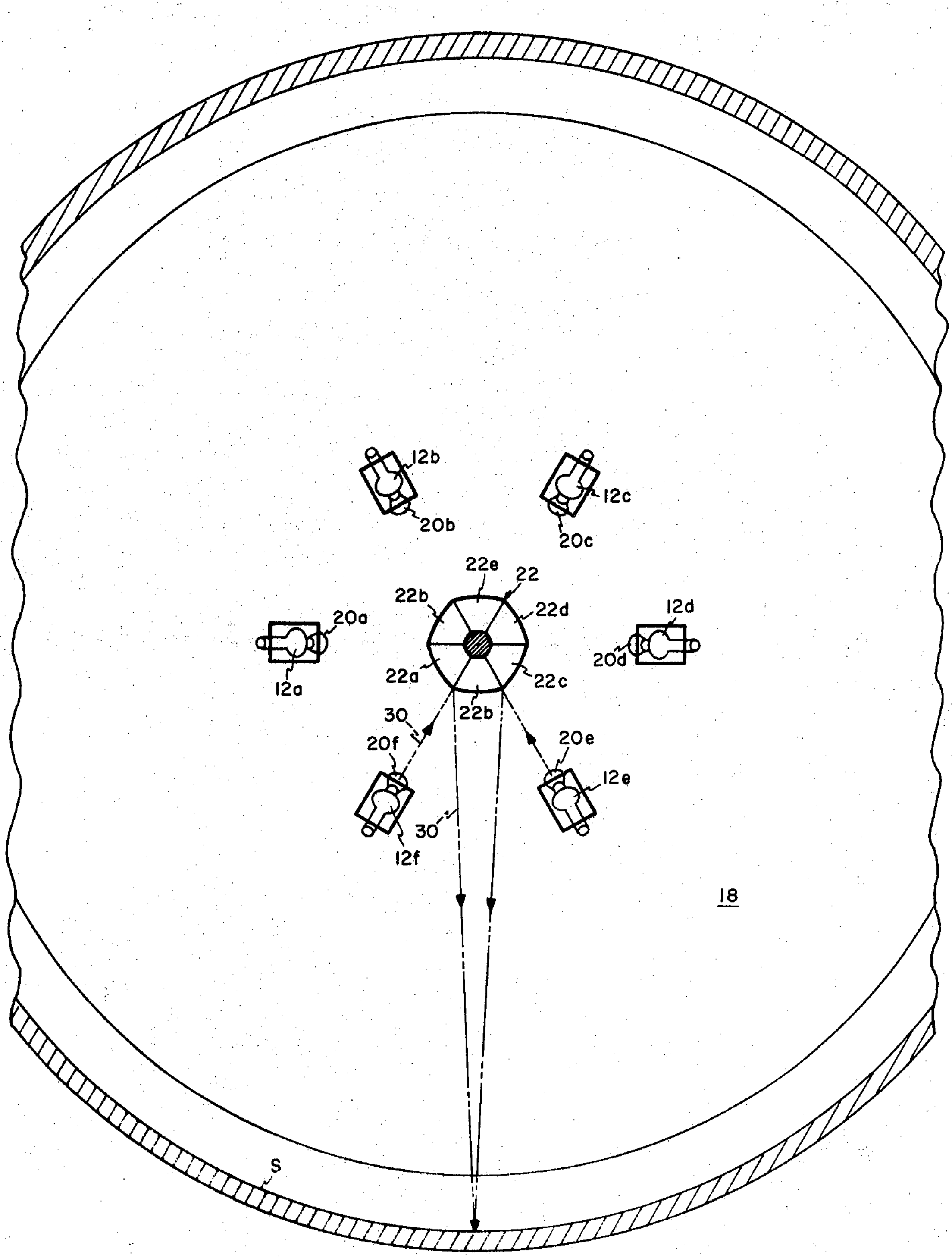
FIG. 2 is a horizontal sectional view of the system of FIG. 1 taken substantially along line 2—2 thereof.
Figure 3A:
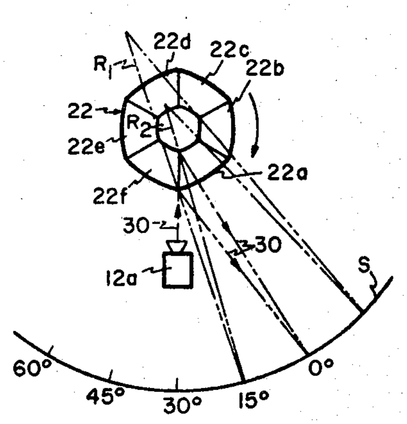
Figure 3B:
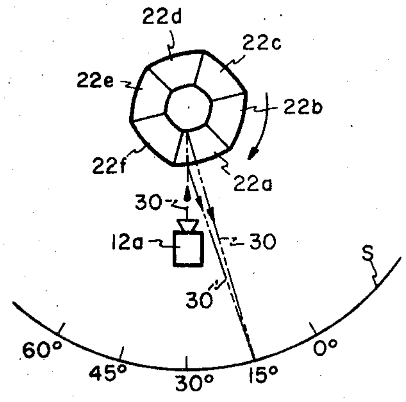
Figure 3C:
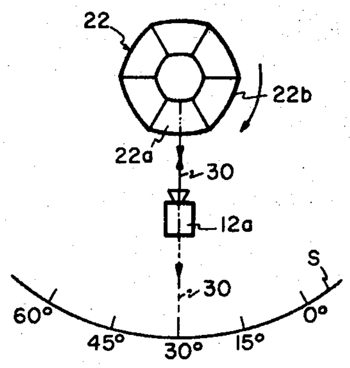
Figure 3D:
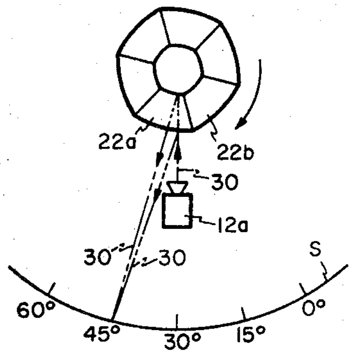
Figure 3E:
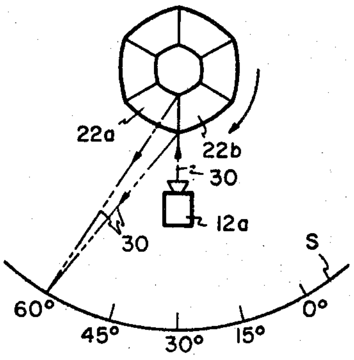
Figure 3F:
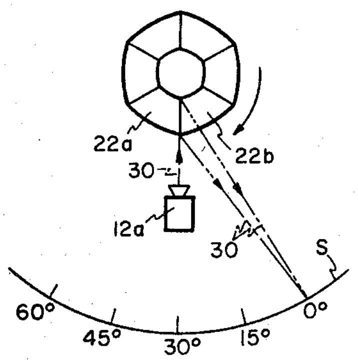

In the form of the invention illustrated in the drawings and described hereinafter, there is provided a panoramic television display system, indicated generally at 10, comprising a spherically curved, 360° panoramic projection screen S and a plurality of television projection tubes 12*a* – 12*f*. These projection tubes are rigidly fixed to a supporting framework 14 which conveniently extends downwardly from the ceiling level 16 of a structure in which the system is housed, while the screen S is conveniently supported by the floor 18 of that structure. The projection tubes 12*a* – 12*f* are disposed in equidistant relation to one another, as is best shown in FIG. 2, and are aimed to project downwardly and inwardly through corresponding projection lens means 20*a* – 20*f* onto a rotatable, multi-faceted, reflection element 22. The projection tubes are each operated in a single, vertical line scan mode and cooperate with the facets of the rotating reflection element, in a manner which will become apparent as the specification proceeds, to generate a 360° raster on the screen S.

The reflection element 22 is supported for rotation about its vertical axis by a motor 24 mounted on the frame 14. The axis of rotation of the reflection element 22 is also the central vertical axis of the spherically curved screen. In this exemplary embodiment wherein there are six video projection channels served by projection tubes 12*a* – 12*f*, the reflection element 22 is provided with six facets 22*a* – 22*f*. The contours of each facet are such that all light rays from a focal point 28, mediated by a facet and reflected to the screen S, follow optical paths which are equal in length as is required for sharp focus of an image on the screen.

Moreover, the contours of the facets are such that they provide a linear scan from top to bottom. That is, as a single line scan is generated on the face of the projection tube 12$a$, in a direction from top to bottom for example, and as the scanning beam moves through the scan line length, the corresponding light rays 30 travel through proportionate parts of the vertical distance of a facet and the reflected portion of the rays 30 travels down a proportionate part of the screen S. The desired vertical sweep length on the screen S is predetermined, and in this example subtends a vertical angle of 60°.

The horizontal contours of each of the facets of the reflective element 22 are such that upon rotation of the reflective element the light rays projected by each of the tubes 12$a$ – 12$f$ will be caused to experience a 60° horizontal sweep component across the surface of the screen S for each 60° of rotation of the reflective element. This effect is best illustrated in FIGS. 3$a$ – 3$f$. Thus, FIG. 3$a$ shows the leading edge of facet 22$a$ at the point of interception of the light beam 30 from television projection tube 12$a$. At this point the projected single-line-scan falls on the left edge of facet 22$a$ and is reflected to the indicated zero degree point on screen S. The horizontal contour of facet 22$a$ is varied in shape from bottom to top to assure equal optical paths from bottom to top and to assure that the beam would fall in a vertical line on the screen S if the element 22 were not rotating. The radii of horizontal increments from the bottom of the reflective assembly facet 22$a$ to the top will be different. The bottom and top radii of curvature for the facet 22$a$ are indicated in FIG. 3$a$ as $R_1$ and $R_2$ respectively with all other radii length falling between.

FIG. 3$b$ shows facet 22$a$ after rotating through the next 15° and the reflected beam being advanced to the 15° point indicated. FIGS. 3$c$ and 3$d$ show intermediate points of advancement, and 3$e$ shows the beam reflected from the right or trailing edge of the facet so as to fall on the 60° position of the screen, thereby completing a 60° sweep. It should be noted at this point that in the preferred embodiment each of the projection tubes 12$a$ – 12$f$, all of which sweep in synchronism, repeat the top to bottom vertical sweep a predetermined number of times during the time required for one sixth of a revolution of the reflective element 22. Assuming the tubes to each make say 252.5 repetitions of the vertical line scan during the first 60° of rotation of the element 22, the facet 22$a$ and each of the other facets 22$b$ – 22$f$ will lay down 252.5 vertical (or nearly vertical) lines on each 60° segment of the screen. FIG. 3$f$ shows the adjacent sector 22$b$ starting an interlace sweep, which will start at the half-line point on the zero azimuth. All facet sectors will be going through the aforementioned sweep process simultaneously, forming first fields and interlace fields of the raster alternately.

As an alternative and using the same equipment, instead of drawing a raster consisting of parallel vertical lines all around the screen S as described above, the timing of vertical scans by the projection tubes in relation to the rate of rotation of the reflection element 22 can be selected to produce a plurality of fields each of which consists of a multi-turn spiral drawn on the screen. This has the same effect as a plurality of horizontal lines in appearance on the screen. The number of turns that each such spiral line will make will depend on the speed of rotation of the element 22. Thus, if element 22 rotates M times in the time required for one vertical sweep of each projection tube, there would be M turns per spiral. If there are N vertical sweeps begun by each projection tube during the period required for one full vertical sweep, there will be N interlaced fields and an effective horizontal line density of MN at any position around the screen.

Figure 4:
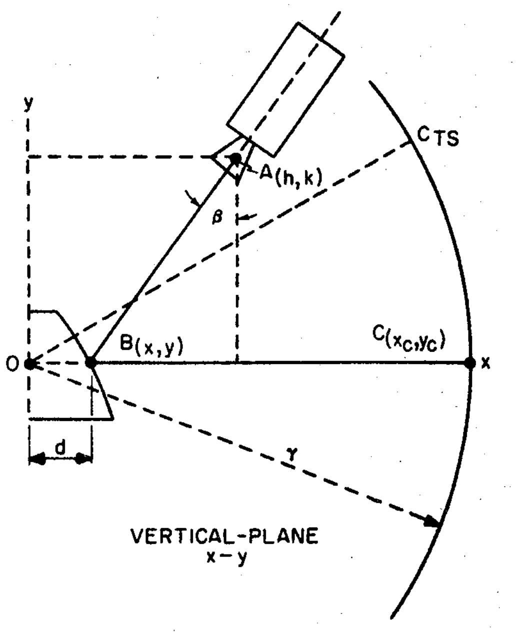

Refer now to FIG. 4, which shows in more detail the relationships between the projection tubes and lens means, the reflector element 22, and the screen S. The projection tube 12$a$ and lens means 20$a$ are positioned above the top reflected ray to avoid interference. The projector is also positioned at a distance from the center so that, with the selection of a narrow angle lens means, the vertical length of the reflector facet 22$a$ can be kept short in order to keep the overall size of the reflector element 22 small. Further the optical axis is aligned to intercept the midpoint of the reflection element 22 at the $x$-axis at a distance $d$ from the center 0. Initially $d$ is arbitrarily selected to give the reflection element 22 the approximately desired size. Resulting from these initial selections are direct ray source point A, with $x$-coordinate $h$ and $y$-coordinate $k$ and angle $\beta$. Angle $\beta$ is the angle the projection axis makes with the $y$-axis. For the midscan point $B(x,y)$, $x = d$ and $y = 0$. The midscan point on the screen is $C(x_c, y_c)$, where $x_c = r$ and $y_c = 0$. The length $r$ is the radius of the spherical screen as measured from 0.

The optical path $l$ is equal to $\overline{AB} + \overline{BC}$ and is determined from the midscan conditions described above. Path $l$ is maintained constant for all sets of direct plus reflected rays in the system. Since $\overline{AB} = [\ (h-d)^2+k^2]$ , and $\overline{BC} = r - d$, then:

$$[\ (h-d)^2 + k^2\ ] \quad + r - d = l. \qquad 1$$

Figure 5:
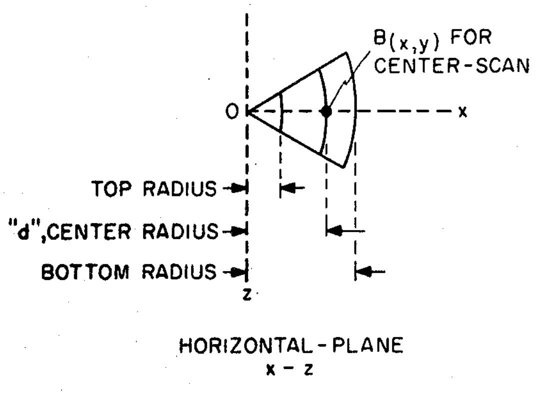

FIG. 5 shows the relationship of a single reflector facet 22$a$ and the $x$-axis where Equation 1 applies. The contours of top, center and bottom are indicated and will be developed later. The radii shown are for points on the $x$-axis, keeping in mind that radii of the facet contour will not originate at 0.

Figure 6:
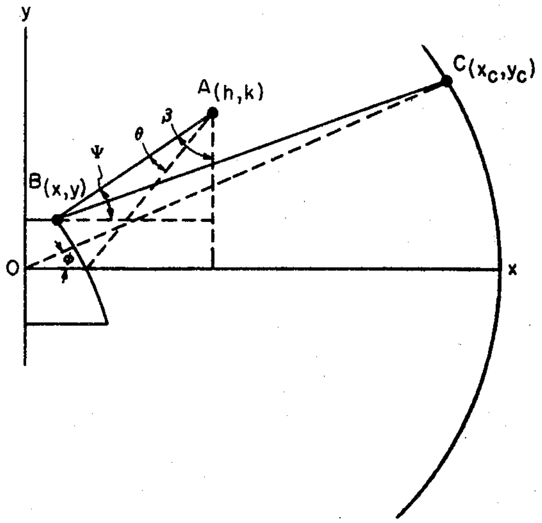

FIG. 6 shows the top scan position in the $x$–$y$ plane. Angle $\theta$ is shown and is the angle the direct ray $\overline{AB}$ makes with the projection axis. Angle $\Psi$ is the angle the direct ray $\overline{AB}$ makes with the $x$-axis; thus, $\Psi = 90 - \theta - \beta$. Angle $\Phi$ is the elevation angle of point C on the screen as measured from the center of the system "0"; $\Phi$ is zero when C lies on the $x$-axis and is negative below the $x$-axis. Angle $\theta$ is also negative below the projection axis. The relationship between $\Phi$ and $\theta$ is constant, $\eta$ ; $\eta = \theta \div \Phi$; thus, $\theta = \eta\ \Phi$. Angle $\Psi$ can be expressed as $(90 - \eta\ \Phi - \beta)$.

From FIG. 6 a general expression for $\overline{AB}$ can be written, thus:

$$\overline{AB} = k{-}y/\sin\Psi. \qquad 2$$

Also:

$$\beta = \tan^{-1} h{-}d/k.\ /k. \qquad 3$$

Since $\tan\Psi = k{-}y/h{-}x$, $$\text{then } x = h - k{-}y/\tan\Psi. \qquad 4$$

Equation 4 contains the angle constraints of $\beta$, $\theta$ and $\Phi$ in angle $\Psi$.

Figure 7:
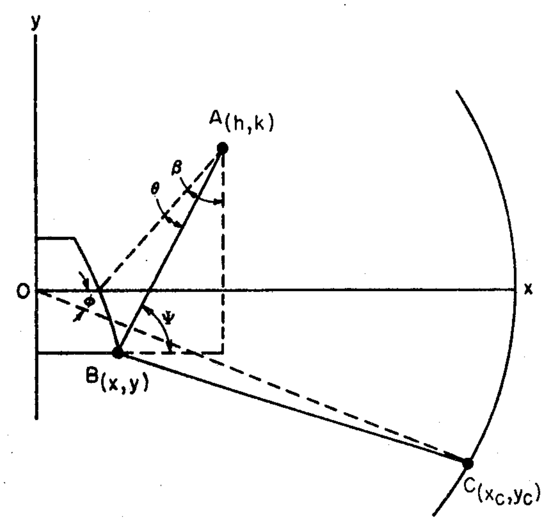

FIG. 7 illustrates the bottom-scan position in the $x$–$y$ plane. Angles $\theta$ and $\Phi$ are negative; thus $\Psi = (90 + \theta - \beta)$ or $\Psi = (90 + \eta\ \Phi - \beta)$.

FIG. 8 illustrates the system with the reflector rotated to one edge, thus producing reflected rays through angle $\alpha$. This figure shows top, center and bottom scan positions. From this figure a general equation for reflected ray $\overline{BC}$ can be written:

$$\overline{BC} = [ (x_c-x)^2 + (y_c-y)^2 = z_c^2 ] \quad , \qquad 5$$

where:

$x_c = r \cos \Phi \cos \alpha$, $y_c = r \sin \Phi$ and $z_c = r \cos \Phi \sin \alpha$.

Since $\overline{AB} + \overline{BC} = l$, combining Equation 2 and Equation 5 gives:

$$(k-y)/(\sin \Psi) + [ (x_c-x)^2 + (y_c-y)^2 + z_c^2]^{\cdot} = l. \qquad 6$$

Substituting for $x_c$, $y_c$ and $z_c$:

$$(k-y/\sin \Psi) + [ (r \cos \alpha \cos \Phi - x)^2 + (r \sin \Phi - y)^2 + (r \sin \alpha \cos \Phi)^2] = l.$$

Rearranging and squaring both sides:

$$(r \cos \alpha \cos \Phi - x)^2 + (r \sin \Phi - y)^2 + (r \sin \alpha \cos \Phi)^2 = [ l - (k-y/\sin \Psi)]^2.$$

Expanding and substituting Equation 4 for $x$:

$$\sin^2\Psi[r^2 \cos^2 \alpha \cos^2\Phi - 2r \cos\alpha \cos \Phi (h \tan \Psi - k + y/\tan \Psi) + (h \tan \Psi - k + y/\tan \Psi)^2 + r^2 \sin^2 \Phi - 2yr \sin \Phi + y^2 + r^2 \sin^2 \alpha \cos^2\Phi] = l^2 \sin^2 \Psi - 2kl \sin \Psi + 2yl \sin \Psi - 2ky + k^2 + y^2.$$

Further expanding and regrouping:

$$y^2 (\cos^2 \Psi + \sin^2 \Psi - 1) + y(2h \sin \Psi \cos \Psi - 2r \cos \alpha \cos \Phi \sin \Psi \cos \Psi \cos \Psi - 2k \cos^2 \Psi - 2r \sin \Phi \sin^2 \Psi - 2l \sin \Psi + 2k) + r^2 \cos^2 \alpha \cos^2 \Phi \sin^2 \Psi - 2hr \cos\alpha \cos \Phi \sin^2 \Psi + 2 kr \cos\alpha \cos \Phi \sin \Psi \cos \Psi + h^2 \sin^2 \Psi - 2 ]kh \sin \Psi \cos \Psi + k^2 \cos^2 \Psi + r^2 \sin^2 \Phi \sin^2 \Psi + r^2 \sin^2 \alpha \cos^2 \Phi \sin^2 \Psi - l^2 \sin^2 \Psi + 2kl \sin \Psi - k^2 = 0.$$

$y^2$ drops out and the expression further reduces to:

$$y \{ 2 [ \cos \Psi (h - r \cos\alpha \cos \Phi) + \sin \Psi (k - r \sin \Phi) - l ] \} + \sin \Psi (r^2 - 2hr \cos\alpha \cos \Phi + h^2 - l^2 - k^2) + 2k(r \cos\alpha \cos \Phi \cos \Psi - h \cos \Psi + l) = 0.$$

Thus $$y = \frac{\sin \Psi (r^2 - 2hr \cos \alpha \cos \Phi + h^2 - l^2 - k^2)}{2[\cos \Psi (h - r \cos \alpha \cos \Phi)} \frac{+ 2k (r \cos \alpha \cos \Phi \cos \Psi - h \cos \Psi + l)}{+ \sin \Psi (k - r \sin \Phi) - l]}. \qquad (7)$$

Substituting the value of $y$ in Equation 4, yields a value for $x$.

FIG. 9 illustrates that the reflected rays, at different vertical levels on the reflector surface, are reflected at different angles in order to produce the displayed scanline in a vertical plane normal to the screen. Angle $\alpha$ here is shown at the completion of a sector sweep, assuming the reflector element 22 is rotating clockwise as viewed from above. Values of angle $\alpha$ for the leading half of the sweep are negative. Angle $\alpha$ is zero at the midpoint of the horizontal sweep.

Equations 7 and 4 can, of course, be programmed for anY suitable computer. Then by inserting values for the known constants, $x$–$y$ coordinates for any point on the reflector surface can be conveniently computed for a desired embodiment.

Now, it will be understood that the described projection system utilizes video signals and synch signals for the projection tubes 12$a$ – 12$f$ which are derived, either directly or in recorded form, from a television camera system 50 such as is shown in FIG. 10. The system 50 comprises a framework 52 supporting six television cameras of which two, 54$a$ and 54$d$, are shown. The cameras are disposed at the same angles with respect to a six faceted reflection element 56 as the projection tubes and lens of the system 10 are with respect to the reflection element 22. A drive motor 58 rotates the reflection element 56 at the same speed as the element

22 and in facet timed relation to single line scan by the six cameras. The system 50 is conveniently inverted with respect to the system 10, and the necessary inversion of signals is readily effected electronically. Additional understanding of synchronism or timing may be obtained by reference to the aforementioned U.S. Pat. No. 3,542,948.

Obviously many modifications and variations of the present invention are possible in the light of the above teachings. It is therefore to be understood that within the scope of the appended claims the invention may be practiced otherwise than as specifically described.

What is claimed is:

1. A 360° panoramic television projection system comprising:

a 360° projection screen extending about a vertical central axis;

a plurality of television projection means, $n$ in number, for generating in synchronism a like number of single line, vertical scanning beams;

a reflection element having n contoured facets and mounted within said screen for rotation about said axis;

support means for supporting said projection means in equally spaced locations about said axis and aimed inwardly at said reflection element; and drive means for rotating said reflection element whereby with each $1/n$ revolution of said element each facet thereof causes one of said beams to sweep $1/n$ of the azimuth of said screen.

2. A projection system as defined in claim 1, and wherein:

said 360° projection screen is spherically curved; and said projection means and said reflection element facets are so located that for any rotative position of said reflection element, the light paths from said projection means to said screen are substantially equal.

3. A projection system as defined in claim 2, and wherein:

$x$ and $y$ coordinates of points on said contoured facets are defined by the following equations: $x = h - (k-y/\tan \Psi)$ $$y = \frac{\sin \Psi (r^2 - 2hr \cos \alpha \cos \Phi + h^2 - l^2 - k^2)}{2[\cos \Psi (h - r \cos \alpha \cos \Phi)} \frac{+ 2k (r \cos \alpha \cos \Phi \cos \Psi - h \cos \Psi + l)}{+ \sin \Psi (k - r \sin \Phi) - l]}.$$

4. A projection system as defined in claim 3, and wherein:

said projection means are operative to modulate the intensity of said beams in response to video signals derived from a television camera system comprising $n$ single, vertical line scanning cameras viewing a panoramic scene through a rotatable reflection element having $n$ contoured facets.

5. A projection system as defined in claim 4, and wherein:

said projection means produce said vertical scan lines at a rate determined by sync signals derived from said camera system; and said drive means for said reflection element of said projection system is responsive to sync signals derived from said camera system.

6. A projection system as defined in claim 5, and wherein:

said projection means are each operable in synchronism to provide a predetermined number of vertical single line scans for each 1n revolution of said reflection element, said predetermined number being characterized as ending, with a fraction, whereby a raster is formed on said screen consisting of successive, interlaced fields of vertical lines.

7. A projection system as defined in claim 5, and wherein:

said reflective element rotates a plurality of revolutions during the time required for one of said vertical line scans; and said projection means are each operable in synchronism to provide additional vertical line scans starting a fraction of a raster line time behind the previously mentioned vertical line scans, whereby a 360° interlace raster of generally horizontal, spiral lines is generated on said screen.

* * * * *